United States Patent [19]

Budin et al.

[11] Patent Number: 5,303,266
[45] Date of Patent: Apr. 12, 1994

[54] MULTIMEDIA HIGH SPEED NETWORK

[75] Inventors: Daniel Budin, Newton; Yoseph Linde, Needham; Gordon Saussy, Brighton; Robert Snyder, Westford; Jack W. Lee, Brookline, all of Mass.

[73] Assignee: Chipcom Corporation, Southborough, Mass.

[21] Appl. No.: 635,486

[22] Filed: Dec. 28, 1990

Related U.S. Application Data

[63] Continuation-in-part of Ser. No. 535,033, Jun. 8, 1990.

[51] Int. Cl.⁵ .............................................. H04B 3/14
[52] U.S. Cl. ............................................ 375/36; 375/7; 370/85.14
[58] Field of Search ......................... 375/12, 36, 7; 370/85.9, 85.13, 85.14, 94.1

[56] References Cited

U.S. PATENT DOCUMENTS 4,850,042  7/1989  Petrinio et al. ............... 359/176
4,983,010  1/1991  Popp ............................ 359/120

OTHER PUBLICATIONS

"Contribution to IEEE Project 802.6 on Metropolitan Area Networks," Oct. 30 1984, Isaman et al.

Primary Examiner—Curtis Kuntz
Assistant Examiner—Young Tse
Attorney, Agent, or Firm—McGlew and Tuttle

[57] ABSTRACT

A system is provided implementing an extremely high speed link allowing selection of either twisted pair (or like media) and fiber media in to provide a high speed multimedia local area network. A high speed transmission link for twisted pair, coaxial cable media or the like includes a transmitter with a conversion device for receiving fiber optic data interface signals intended to drive a fiber optic data interface and for converting these fiber optic data interface signals into high speed transmission link signals of a form suitable to drive a twisted pair medium. A receiver is provided and includes a reconversion device for regenerating the signal received from the twisted pair medium back to an adequate signal level. The transmitter conversion device includes a buffer cooperating with an equalizer and a filter for forming the high speed transmission link signal. The equalizer provides frequency domain compensation for the characteristics of the twisted pair medium. The filter rejects signals outside a band of data signaling. The receiver reconversion device includes a filter connected to said twisted pair medium to reject signals outside a band of data signaling, a buffer for regenerating the signal received from the twisted pair and a low frequency restoration circuit which employs a decision feedback technique for the compensation of the media coupling circuit's low frequency response.

7 Claims, 12 Drawing Sheets

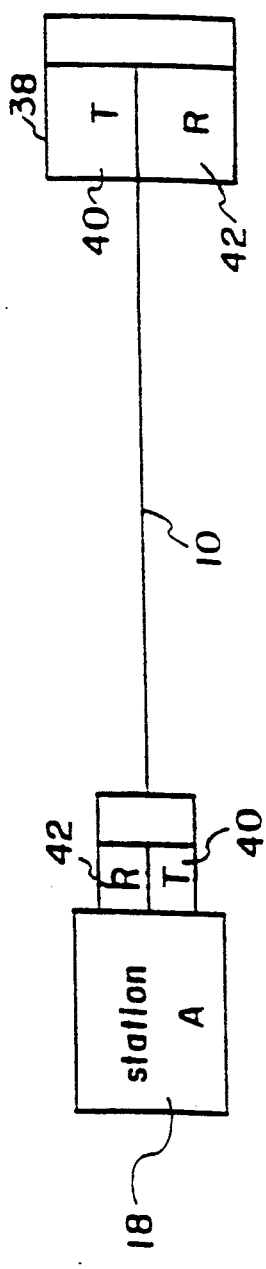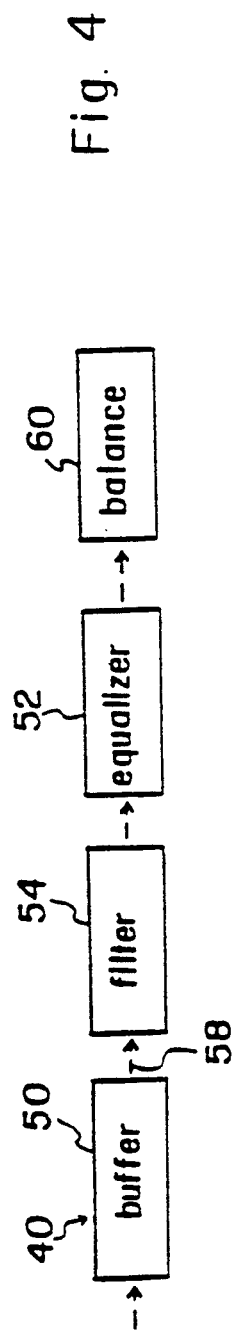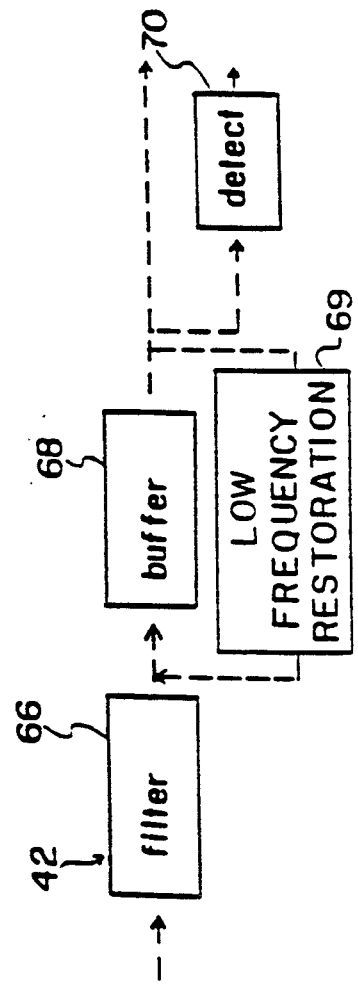

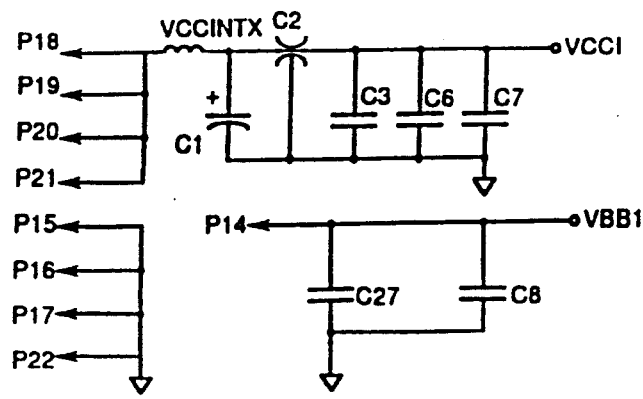
FIG. 6B
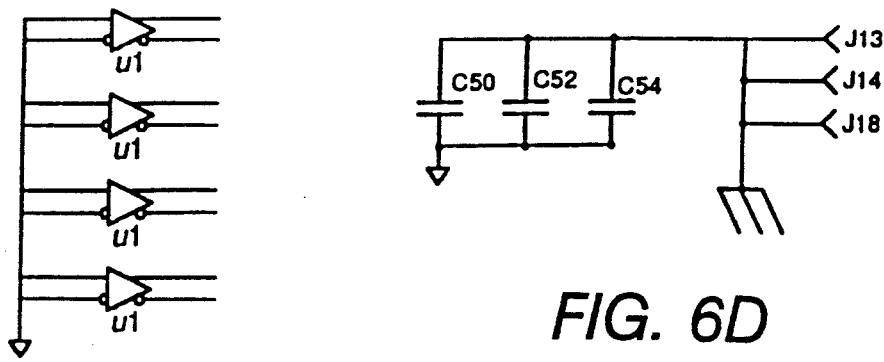
FIG. 6C
FIG. 6D

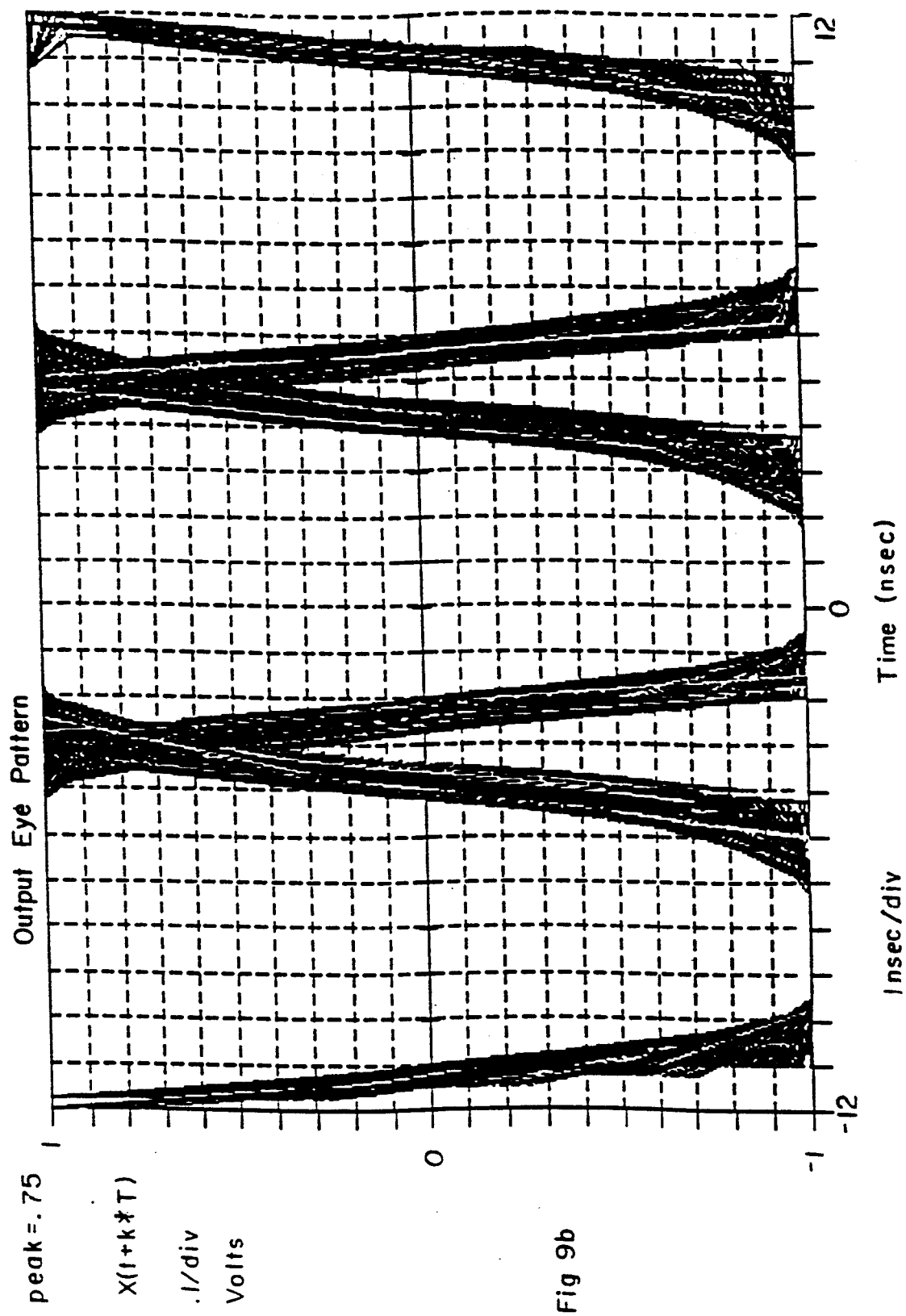

MULTIMEDIA HIGH SPEED NETWORK

CROSS REFERENCE TO RELATED APPLICATIONS

This application is a continuation-in-part application of application Ser. No. 07/535,033 filed Jun. 8, 1990.

BACKGROUND OF THE INVENTION

1. Field of the Invention

The present invention relates in general to network implementations and more particularly to the Fiber Distributed Data Interface (FDDI) defined by the ANSI X3T9.5 standard.

2. Brief Description of Related Prior Art

The standard which defines FDDI operates on point-to-point fiber optic links arranged to form a ring. The data rate on these links is 100 megabits per second, encoded to run at 125 megabauds. Extremely high data rates are involved. Accordingly, the standard specifies only fiber optic media implementations of the network given the extremely high data rate.

Lower speed networking standards have been specified to run on lower cost copper media. For example, IEEE standard 802.5 specifies networks which are similar in concept to the FDDI. These networks run at 4 or 16 megabits per second (8 or 32 megabauds after encoding) on a shielded twisted paid medium. This IEEE standard 802.5 also known as a token passing ring network may also be implemented as a series of point-to-point links connected to form a ring. Other networks such as IEEE standard 802.3, also known as 10Base-T, specify an unshielded twisted pair medium for up to 20 megabaud signaling Fiber optic media has some desirable aspects for communication systems. For example, fiber optic media provides high security as compared with copper media with its associated radiated emissions. Fiber media provides capacity for speeds up to gigabauds. Additionally, fiber media may link distances up to two kilometers. Unfortunately, the costs associated with these media are very high.

Copper media such as shielded twisted pair provides a much more cost effective solution for shorter links. Efficiency for short links is extremely important as studies have shown that most links in a typical network are less than 100 meters in length. Accordingly, the need to link distances up to two kilometers is often not a significant consideration. The high costs of the fiber media may often be a very great consideration.

SUMMARY AND OBJECTS OF THE INVENTION

It is an object of the invention to provide a multimedia high speed network which offers users a choice of either fiber optic or shielded twisted pair media for implementing a fiber distributed data interface such that the user may choose the best, most practical or most efficient medium for each link of the network, based on cost, link distance and other requirements.

It is a further object of the invention to provide a high speed network which employs shielded twisted pair media for one or more links of the network and which operates at FDDI rates of up to 125 megabauds.

According to the invention, a high speed transmission link is provided for twisted pair, coaxial cable media or the like. At first glance, the technical considerations for running FDDI over twisted-pair media seem very challenging. A technical solution for running FDDI over twisted pair must provide adequate performance over acceptable distances on the cable. It must meet applicable emissions standards, and should be simple and compact, to facilitate implementation in a form factor equivalent to that used for optical transceivers.

There are a number of technical problems that must be addressed by any implementation running FDDI over twisted pair. The most obvious problem is handling the tremendous variation in the frequency response of the cable across the very wide bandwidth required by the FDDI signal. In addition, twisted-pair cables have inherent "crosstalk", or coupling of signals from one cable to another, that can degrade performance. Another concern is the response of the twisted-pair link at low frequencies, because signals are generally coupled onto twisted-pair media through transformers, very low frequencies in the signal can be significantly attenuated.

The first concern to be addressed is the distortion introduced by the twisted-pair medium as the signalling frequency is increased. Twisted-pair media have intrinsic "loss" due to the physical properties of the cable. If a signal is injected into one end of the cable, a much weaker signal comes out the other end, because the cable has "loss". In addition, the amount of loss that the cable has depends on the frequency of the signal. The loss is fairly low for low-frequency signals, and increases rapidly as the signal frequency is increased. The loss likewise increases linearly as the length of the cable is increased.

Because of the coding scheme specified in the FDDI standard, a 100 Megabit FDDI signal actually runs on the wire at 125 Megabauds. Because these bits can be almost any random combination of ones and zeroes, the FDDI signal is not concentrated at a single frequency; rather, the signal has energy spread across almost all frequencies between zero ("DC") and the maximum signalling rate of 125 MHz.

When a signal spread across such a broad frequency range is transmitted on a twisted-pair cable, tremendous distortion results. Low frequencies in the signal are transmitted down the cable with relatively low loss, while higher frequencies are transmitted with very high loss. Even the highest-quality (lowest-loss) twisted-pair cables will produce unrecognizable noise after 100 meters, when driven with a 125 Megabaud signal.

In order to use twisted-pair cables for high-frequency signals, a technique called "equalization" must be employed. An "equalizer" is a circuit which compensates for the cable's loss behavior across the full bandwidth of the signal. That is, the equalizer has high loss where the cable has low loss, and has low loss where the cable has high loss, so that the resulting combination of cable and equalizer has a flat loss characteristic across the signal bandwidth.

The equalization problem is actually more difficult than it may sound. As mentioned before, the cable's loss also varies with distance. Thus, an equalizer designed to correct the cable's loss behavior perfectly at one distance will not be ideal for any other distance; in fact, a poorly designed equalizer may even make the situation worse at some distances. There are a number of methods of addressing this problem; the simplest is to use a fixed equalizer optimized so that it provides good performance over a variety of distances. Alternatively, "adaptive" equalization schemes, which automatically adjust their characteristic depending on the length of the cable, may be employed.

One subtle issue involved in using twisted-pair media for FDDI signalling is the problem of low-frequency response. Because of the higher signalling rate, FDDI signals contain much more energy at high frequencies than Ethernet or Token Ring signals. In addition, the coding scheme used for FDDI has much more energy at low frequencies than the coding schemes used for Ethernet or Token Ring. Thus, the twisted-pair FDDI link must not only provide superior high-frequency performance, but must also provide better low-frequency performance than that required by either Ethernet or Token Ring.

The invention comprises a transmitter with conversion means for receiving fiber optic data interface signals intended to drive a fiber optic data interface and for converting the fiber optic data interface signals into high speed transmission link signals of a form suitable to drive a twisted pair medium. The transmitter conversion means includes a buffer which receives the fiber optic data interface signals and converts the signals into signals suitable to drive a twisted pair medium via the equalizer and filter. The equalizer provides frequency domain compensation for the characteristics of the twisted pair medium. The filter rejects signals outside the band of the data signaling. The transmitter further includes a balancing circuit for receiving the resulting signal from the conversion means and for coupling the converted signals onto a twisted pair and for ensuring signal balance on the two twisted wires of the medium for promoting good signal quality and also reducing radiated emissions. A receiver is provided which includes a filter, a buffer, a low frequency restoration circuit and a signal detect circuit. The filter serves mainly to reject signals outside the band of the data signaling. The buffer receives signals from the filter and serves to regenerate the signal received from the twisted pair medium back to adequate signal levels.

While the twisted-pair cable itself has excellent transmission characteristics at low frequencies, the method coupling to the cable degrades the low-frequency response significantly. In order to provide electrical isolation and insure good signal balance, magnetic transformers are used to couple signals onto twisted-pair cables. These transformers generally have high loss at very low frequencies.

Compensation of the low-frequency response is a subtle problem which cannot be addressed as conveniently as the high-frequency equalization problem. Failure to address this problem will degrade link performance, particularly when data patterns containing significant amounts of low-frequency energy are transmitted.

The low frequency restoration circuit is a decision feedback equalizer which compensates for the loss of the low frequency signal content due to transformer coupling to the media. This is essential, since the line coding of the FDDI contains significant energy transmitted at very low frequencies. The signal detect circuit receives the signal from the buffer and distinguishes between the presence and absence of an input signal. The output of the signal detect circuit is a logical indication of signal presence.

According to a preferred embodiment of the invention, the transmitter buffer employs a single emitter-coupled logic gate, with impedance matching performed at its output terminals. The equalizer is implemented with fixed, discreet passive circuit elements. The equalizer may also be implemented including digital equalization. The filters are preferably implemented with discreet passive components. According to a preferred form of the invention, the balancing circuit is implemented with a transformer arrangement.

According to the preferred embodiment, the receiver filter is implemented with discreet passive components. The receiver buffer is implemented in the preferred embodiment with cascaded line receivers designed in the emitter-coupled logic technology.

The low frequency restoration circuitry is preferably implemented using a high-pass filter, a buffer and a low-pass filter. The combined attenuation of the two filters at any frequency must be high enough so the loop gain (consisting of the receiver buffer, a resistive attenuator at the input to the high-pass filter, the high-pass filter, the low frequency restoration buffer, the low-pass filter and the resistive attenuator at its output) must be less than unity (in order that oscillations may not occur) (positive feedback). At the same time the low frequency response of the feedback must be high enough to compensate for the lost signal in the transformers. The conflict is solved by the limiting of the buffer at the presence of the received signal. This saturation masks the high-pass filter response and leaves the low-pass filter as the only effective filter of the feedback. At the signal absence the buffer is in the linear mode, the high-pass filter is effective and thus the loop gain is much less than unity.

The signal detect circuit is preferably implemented using a peak detector circuit known from the emitter-coupled logic technology, followed by a buffering gate.

According to another feature of the invention, a high speed modular networking concentrator is provided both for twisted pair and fiber optic connections on a user selectable and interchangeable basis. This structure allows the user or designer of an FDDI network to configure each link individually for either fiber optic or twisted pair media. The arrangement includes a concentrator platform providing a base into which a user may install modules serving the desired connection needs. The concentrator platform includes power and central control means for providing power and central control to installed modules. Media dependent modules are provided wherein each media dependent module offers either a fiber optic or twisted pair connection for 125 megabaud data rates. The arrangement employs the high speed transmission link for implementation of the twisted pair links. The arrangement allows the user to flexibly configure networks to include both types of link.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a schematic view showing a high speed transmission link according to the invention;

FIG. 4 is a schematic view of a high speed transmission link transmitter according to the invention;

FIG. 5 is a schematic view of a high speed transmission link receiver according to the invention;

FIGS. 6A, 6B, 6C and 6D are a circuit diagram of the high speed transmission link transmitter according to the invention.

FIGS. 7C and 7D are additional parts of the circuit diagram shown in FIG. 7A.

FIG. 9b is a diagram illustrating the eye pattern output of the receiver with the input as shown in FIG. 9a.

DETAILED DESCRIPTION OF THE PREFERRED EMBODIMENT

Figure 1:
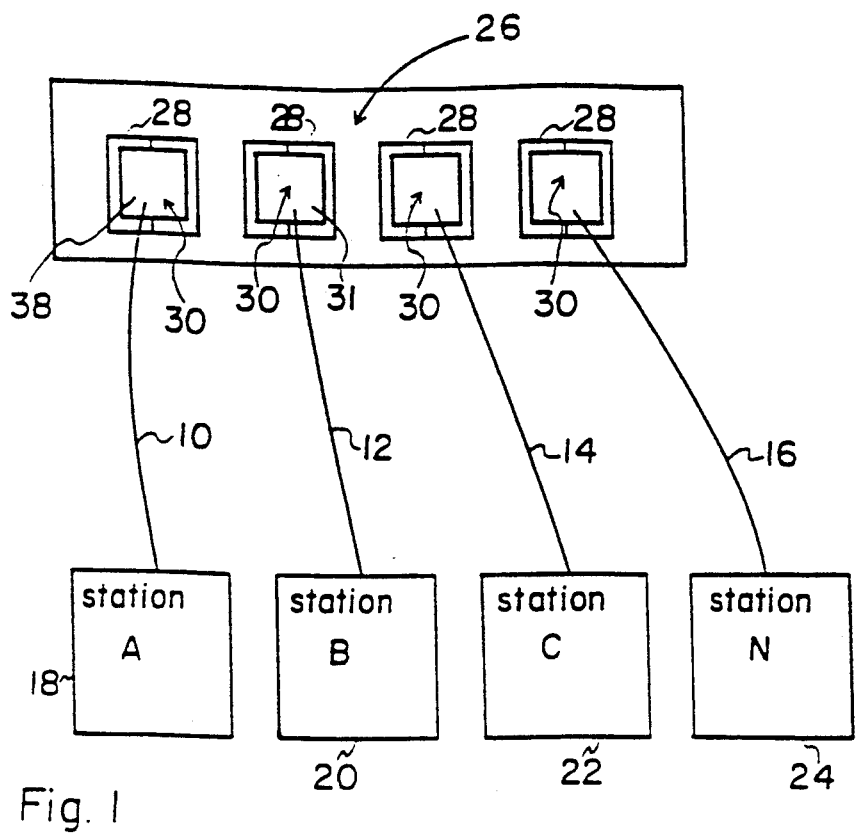
FIG. 1 is a schematic view showing a multimedia high speed network according to the invention.

Referring to the drawings in particular, the invention embodied therein depicted generally in FIG. 1 comprises a first high speed transmission link 10, a second high speed transmission link 12, a third high speed transmission link 14 and an Nth high speed transmission link 16. Each of the transmission links is connected to a remote station such as remote station A designated by 18, remote station B designated 20, remote station C designated 22 and remote station N designated 24. According to the invention, each of the links 10, 12, 14 and 16 are connected to a concentrator platform generally designated 26. The concentrator platform 26 includes a plurality of module slots 28 and is connected to each link by one of a plurality of media dependent modules 30 such as twisted pair module 38 or fiber module 31.

Each of the links 10, 12, 14 and 16 is of a length depending upon the distance between the associated station and the concentrator platform. According to the example shown in FIG. 1, the first link 10 is formed using shielded twisted pair media (or other such media with similar characteristics such as coaxial cable). The second link 12 is also formed using shielded twisted pair media. To highlight important aspects of the invention, in the example of FIG. 1 the third link 14 is provided using fiber optic media. The Nth link 16 may of course be shielded twisted pair or fiber optic media.

Figure 2:
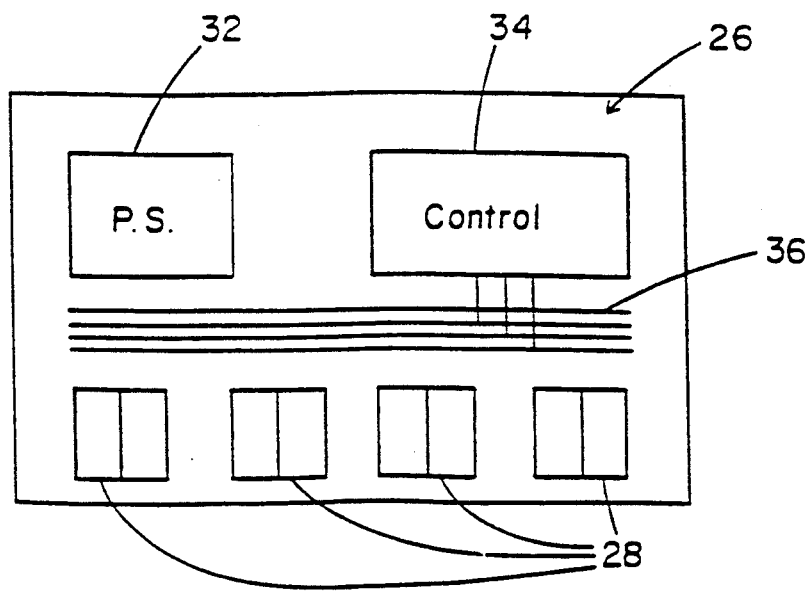
FIG. 2 is a schematic view showing a concentrator platform with media dependent module slots for media dependent modules.
Figure 6A:
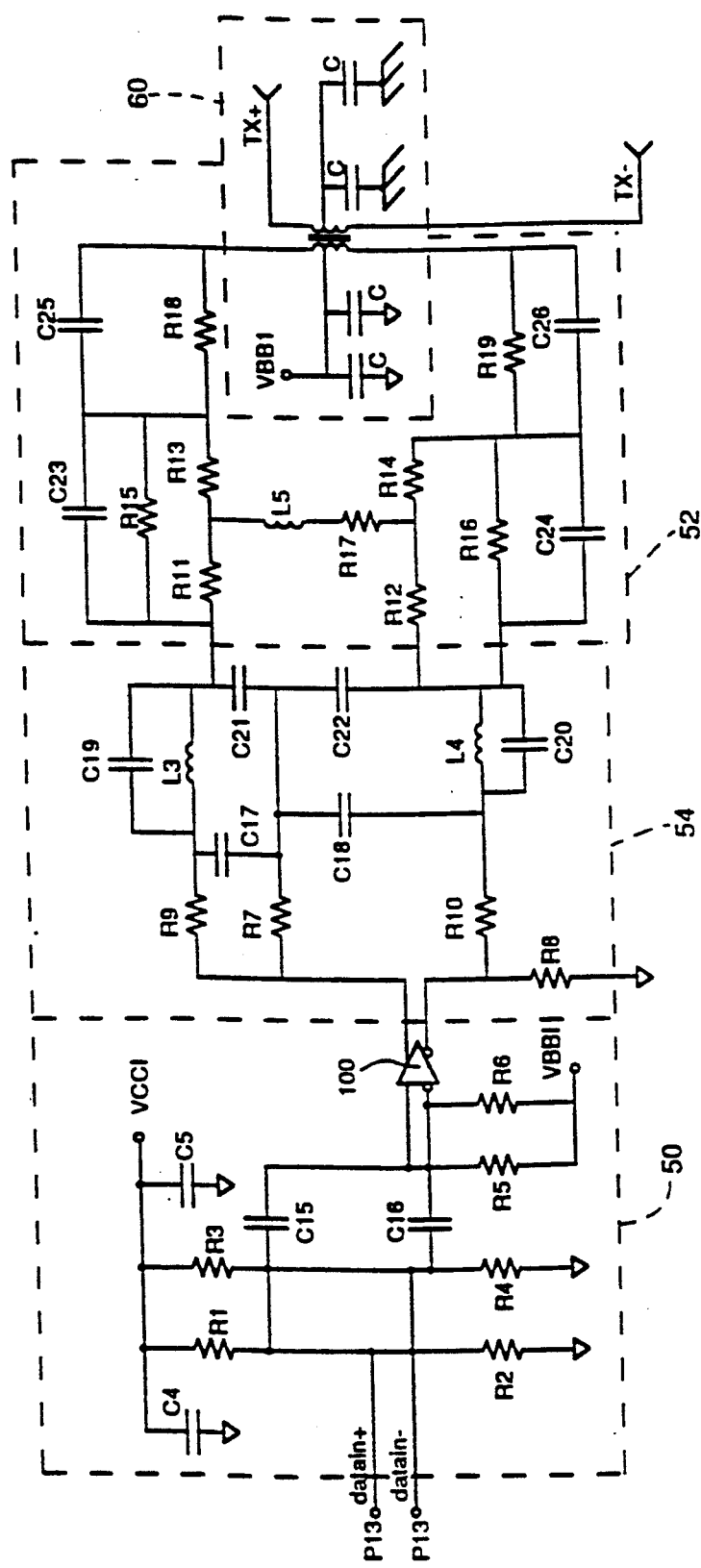
Figure 7A:
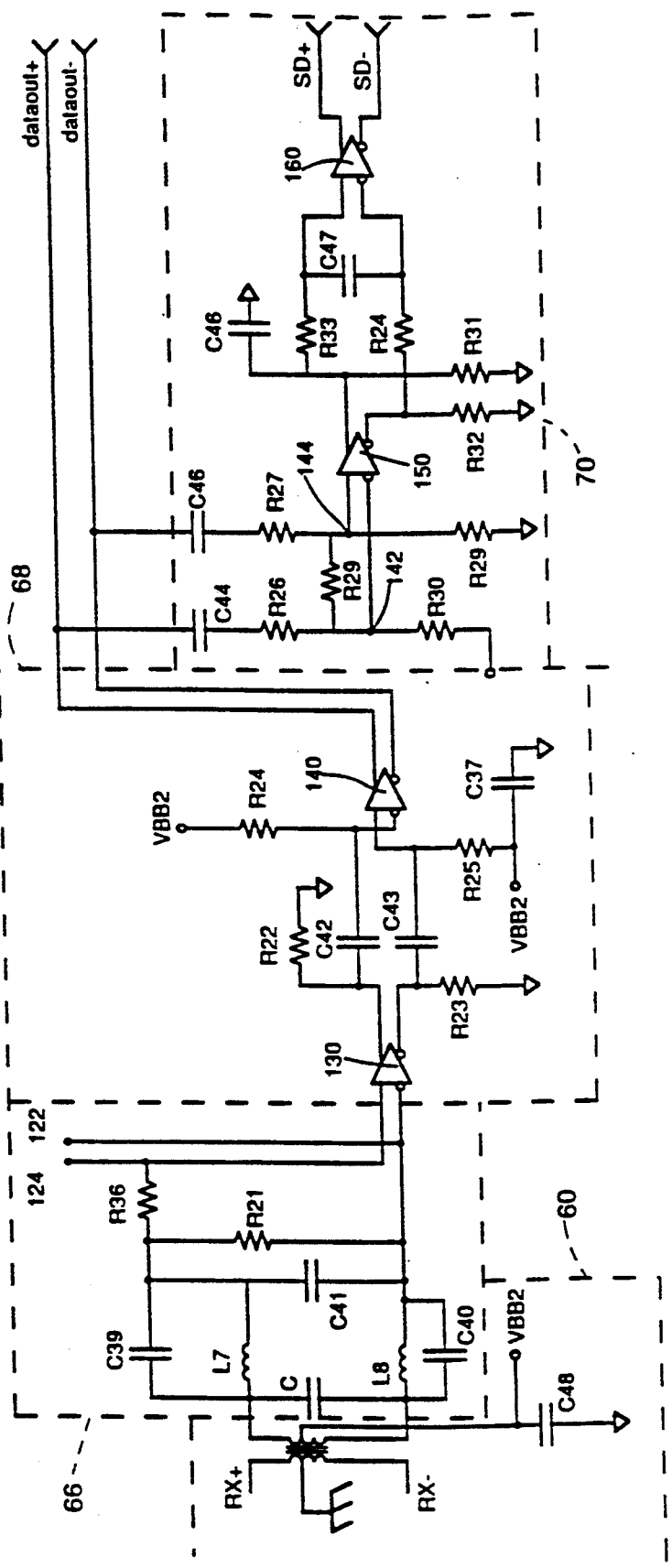
FIGS. 7A, 7C and 7D are a circuit diagram of a part of the high speed transmission link receiver according to the invention.
Figure 7B:
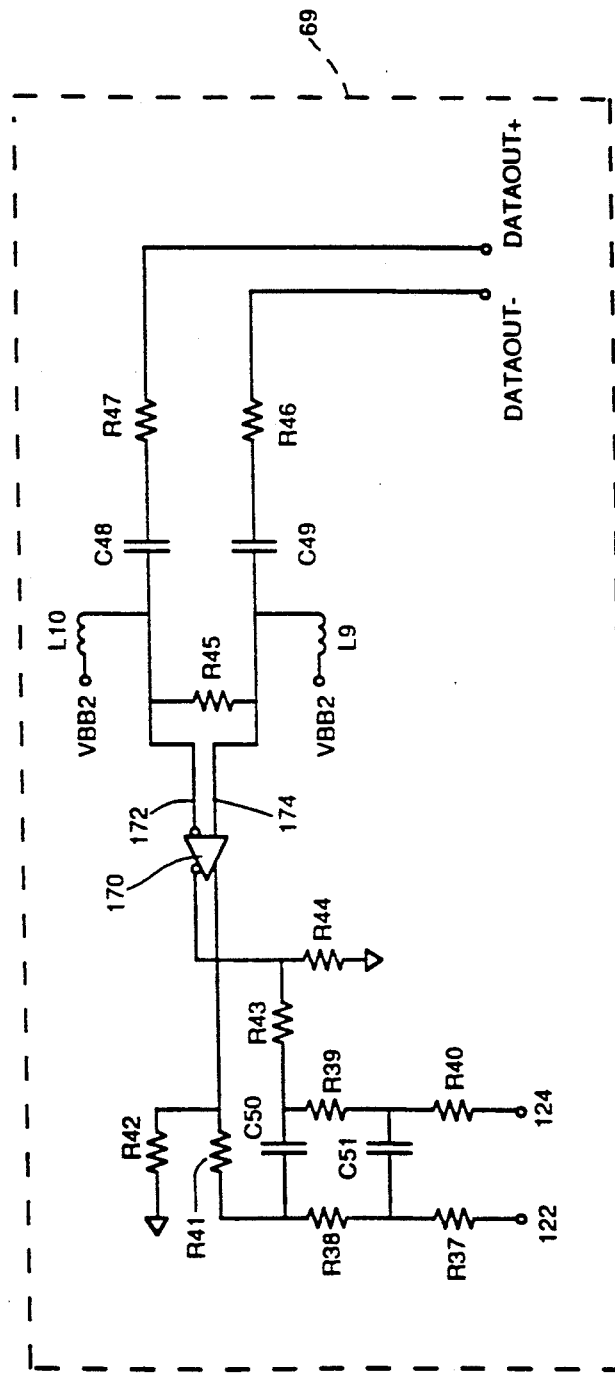
FIG. 7B is a circuit diagram of another part of the high speed transmission link receiver shown in FIG. 7A.
Figure 7C:
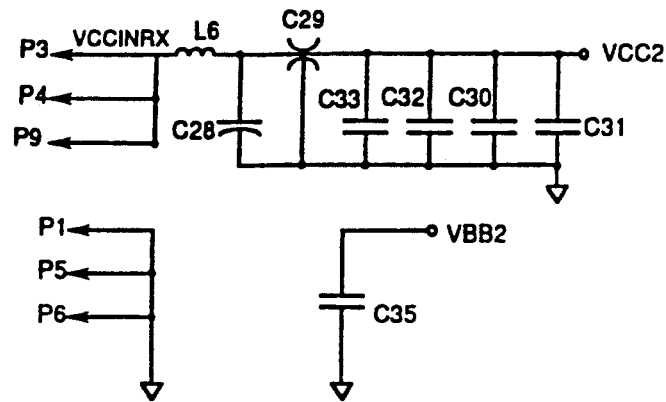
Figure 7D:
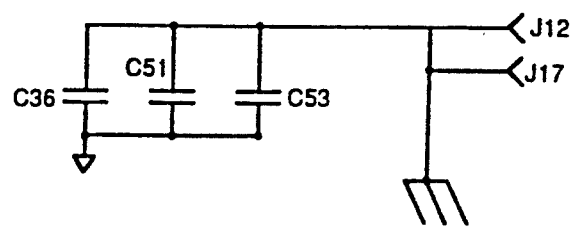

As shown in FIG. 2, the concentrator platform 26 provides connection needs for the various slots 28 to which the modules 30 are connected. Each slot connects to connecting channels 36 including a control/power channel and preferably three data channels. The concentrator platform 26 includes at least one power supply 32 supplying power to the installed modules 30. The concentrator platform 26 also includes central control means 34 providing central control of the installed modules over one or a plurality of connecting channels 36. Each media dependent module 30 is connected to a link (10, 12, 14, 16) and is adapted for the specific media of the connected link. According to a preferred embodiment of the invention, the media dependent module may either be fiber optic module or shielded twisted pair module for 125 megabaud data rates. In the case of the twisted pair links, the arrangement uses the high speed transmission link arrangement described below in detail. This allows the user flexibility in configuring networks so as to include both types of link as shown in the example of FIG. 1.

FIG. 3 shows a station such as station A connected to a media dependent module (a shielded twisted pair module) 38 via the shielded twisted pair link 10.

As seen in FIG. 3 each of the twisted pair media dependent modules such as module 38, includes a receiver 42 and transmitter 40 for the high speed transmission link according to the invention. Each of the stations, such as station A designated 18, which is connected by a shielded pair link such as link 10, includes a receiver 42 and transmitter 40 for the high speed transmission link according to the invention. The high speed transmission link shown in FIG. 3 allows implementation of a 125 megabaud link over a shielded twisted pair media.

As seen in FIG. 4, the high speed transmission link transmitter includes a buffer 50 which receives fiber optic data interface signals intended to drive a fiber optic data interface. The buffer converts the signals into a high speed transmission link twisted pair signal suitable to drive a shielded twisted pair medium link via an equalizer 52 and a filter 54. According to the preferred embodiment, the buffer includes a single emitter-coupled logic gate with impedance matching performed at its output terminals 58.

The buffer acts as other standard buffers such that the signal at the output terminals 58 is clearly either a zero or a 1 expressed, for example, as zero or 5 volts. For example, where a zero signal or low signal is set at zero volts, signals which are close to zero volts are zero volts at output terminals 58 and where a high signal or 1 signal is set at 5 volts, signals near to volts are emitted as 5 volts at the output terminal 58.

The equalizer 52 provides frequency domain compensation for the characteristics of the shielded twisted pair media. According to the preferred embodiment, the equalizer is provided employing fixed, discrete passive circuit elements. An alternative implementation could be provided including digital equalization.

The filter 54 primarily rejects signals outside the band of the data signaling. According to a preferred arrangement, the filter is formed with discrete passive components. The signal is then fed to a balancing circuit 60 via equalizer 52. The balancing circuit couples the signal onto a shield twisted pair such as the shielded twisted pair link 10. The balancing circuit ensures signal balance on the two twisted wires of the medium. This promotes good signal quality. According to a preferred embodiment, the balancing circuit is formed with a transformer.

FIGS. 6A–6D show a preferred layout of the transmitter according to the preferred invention. The values of the individual components shown in FIGS. 6A–6D will necessarily vary according to the impedance of the medium selected. For example, various impedances for twisted pair and coaxial media are commonly used, including 50, 75, 78, 93, 100 and 150 ohms.

According to an implementation of the invention using 150 ohm twisted pair wire, the buffer was implemented wherein capacitor C4 is 0.01 µF (micro Farads), resister R1 is 82 ohms, resister R3 is 82 ohms and capacitor C5 is 0.01 µF. These are connected at VCC1 to capacitor C1 of 10 µF, capacitor C2 of 0.01 µF, capacitor C3 at 0.1 µF, capacitor C6 at 0.01µ and capacitor C7 of 1,000 PF (Pico Farads, connected across an inductor L1 (F-BEADS) to VCCINTX of positive pins P18, P19, P20, P21 and negative pins P15, P16, P17 and P22 (connected to ground). The DATAIN+ (pin P13) is connected by resistor R1 to VCC1 and to gate 100 (µ 1-MC10E11603-XX) through capacitor C15 of 0.01µ and connected to ground over resistor R2 of 132 ohms. The DATAIN+ terminal is connected through capacitor C15 of 0.1 µF and resistor R5 of 2K ohms to VBB1. The DATAIN— terminal is connected to VCC1 over resistor R2, connected to ground over resistor R4 of 132 ohms and connected to gate 100 over capacitor C16 of 0.1µ. The DATAIN—terminal is connected to VBB1 through capacitor C16 over resistor R6 of 2K ohms. VBB1 is connected to pin 14 and connected to ground through capacitor C27 of 0.1 µF and capacitor C8 of 0.01 µF.

According to the implementation using 150 ohm twisted medium, the filter 54 is formed for passing signals within the data band. This may be implemented for the 150 ohm wire with signals from terminals 58 being connected to ground over resistor R7 of 330 ohms and resistor R8 of 330 ohms. The filter is also composed of resistors R9 of 68 ohms, resistor R10 of 68 ohms, capacitor C17 of 10 picofarads, capacitor C18 of 10 picofarads, capacitor C19 of 4 picofarads, capacitor C20 of 4 picofarads, capacitor C21 of 10 picofarads, capacitor C22 of 10 picofarads, inductor L3 of 68 nanohenries and conductor L4 of 68 nanohenries. The signals after being filtered by filter 54 are received by equalizer 52.

Equalizer 52 enhances certain aspects of the signals given the fact that certain aspects of the signals will be attenuated when passed through the twisted pair wire such as the twisted pair medium of 150 ohms used as an example. With such a 150 ohm twisted pair medium, the equalizer includes capacitor C23 of 51 picofarads, capacitor C25 of 1,800 picofarads, capacitor C24 of 5 picofarads, capacitor C26 of 1,800 picofarads. The arrangement includes resistor R11 of 75 ohms, resistor R12 of 75 ohms, resistor R13 of 75 ohms, resistor R14 of 430 ohms, resistor R15 of 110 ohms, resistor R16 of 110 ohms, resistor R17 of 100 ohms, resistor R18 of 39 ohms and resistor R19 of 39 ohms and an inductor L5 of 560 nanohenries.

The balancing circuit 60 is employed wherein the transformer 110 is coupled on one side to the equalizer 52 with a central terminal connected to VBB1 which is connected to ground over capacitor C10 of 0.1 µF and C9 of 1,000 picofarads. The opposite side of transformer 110 is connected to terminal TX+ of the 150 ohm twisted pair medium and TX— of the 150 ohm twisted pair medium with a center contact connected to ground over capacitor C13 of 1,000 picofarads and capacitor C14 of 0.1 µF. (Explain gates, amps shown in FIG. 6 and capacitor C50, C52 and C54 connected to J13, J14 and J18).

Figure 8A:
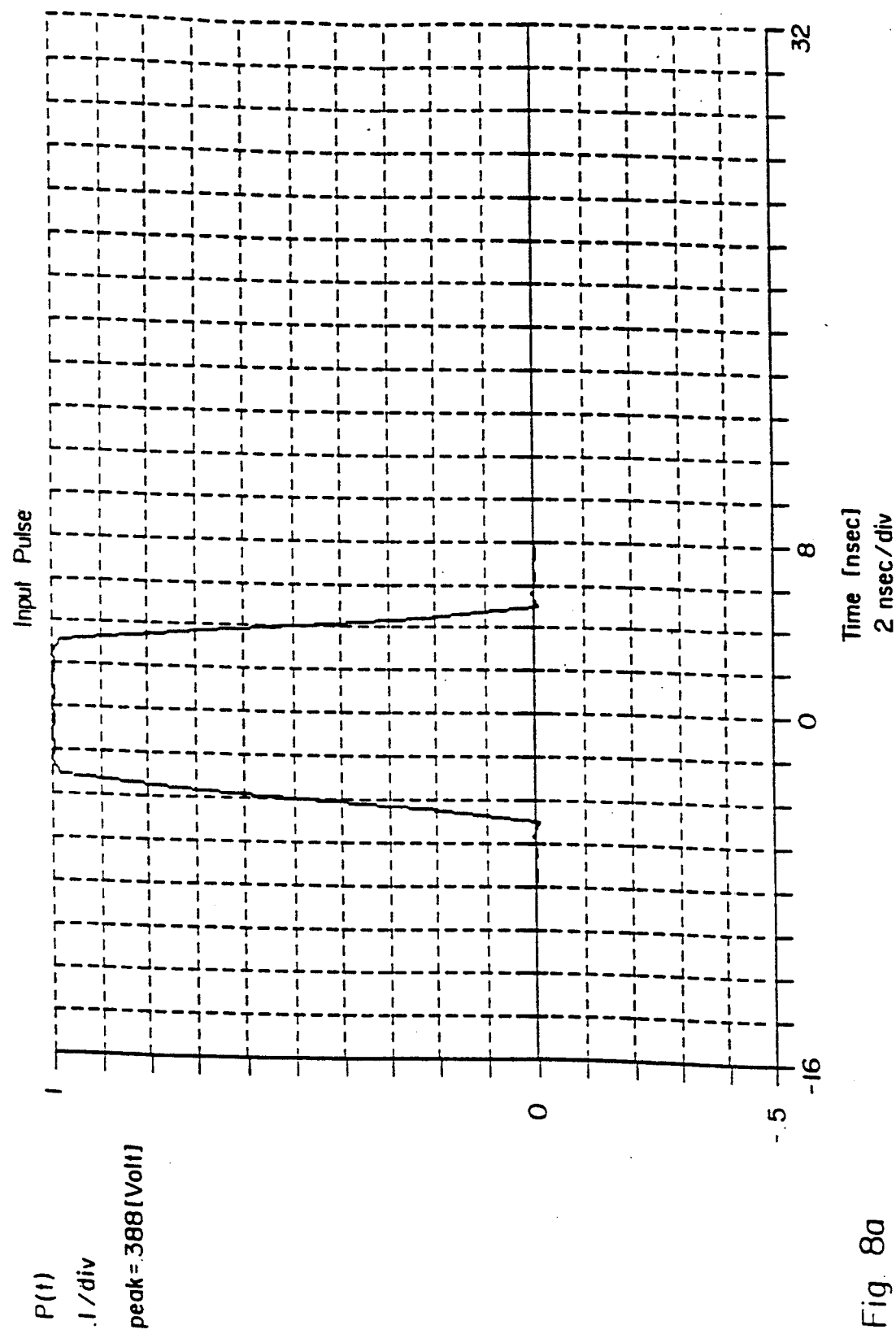
FIG. 8a is a diagram illustrating a logic "one" pulse as the input waveform to the transmitter (input transmit pulse)
Figure 8B:
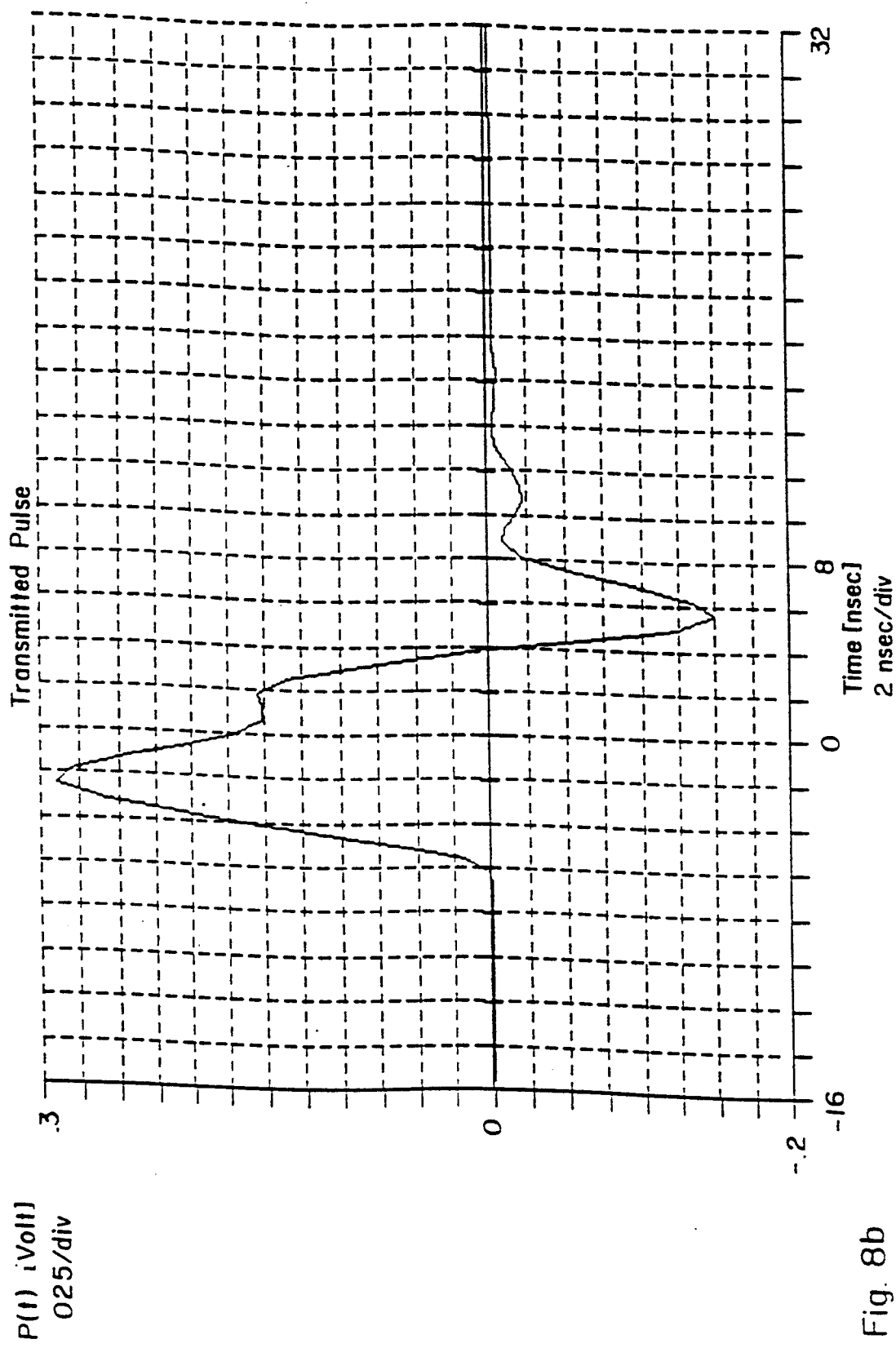
FIG. 8b is a diagram illustrating the output waveform, showing a logic "one" pulse conditioned by the buffer, equalizer and filter (output transmit pulse)
Figure 8C:
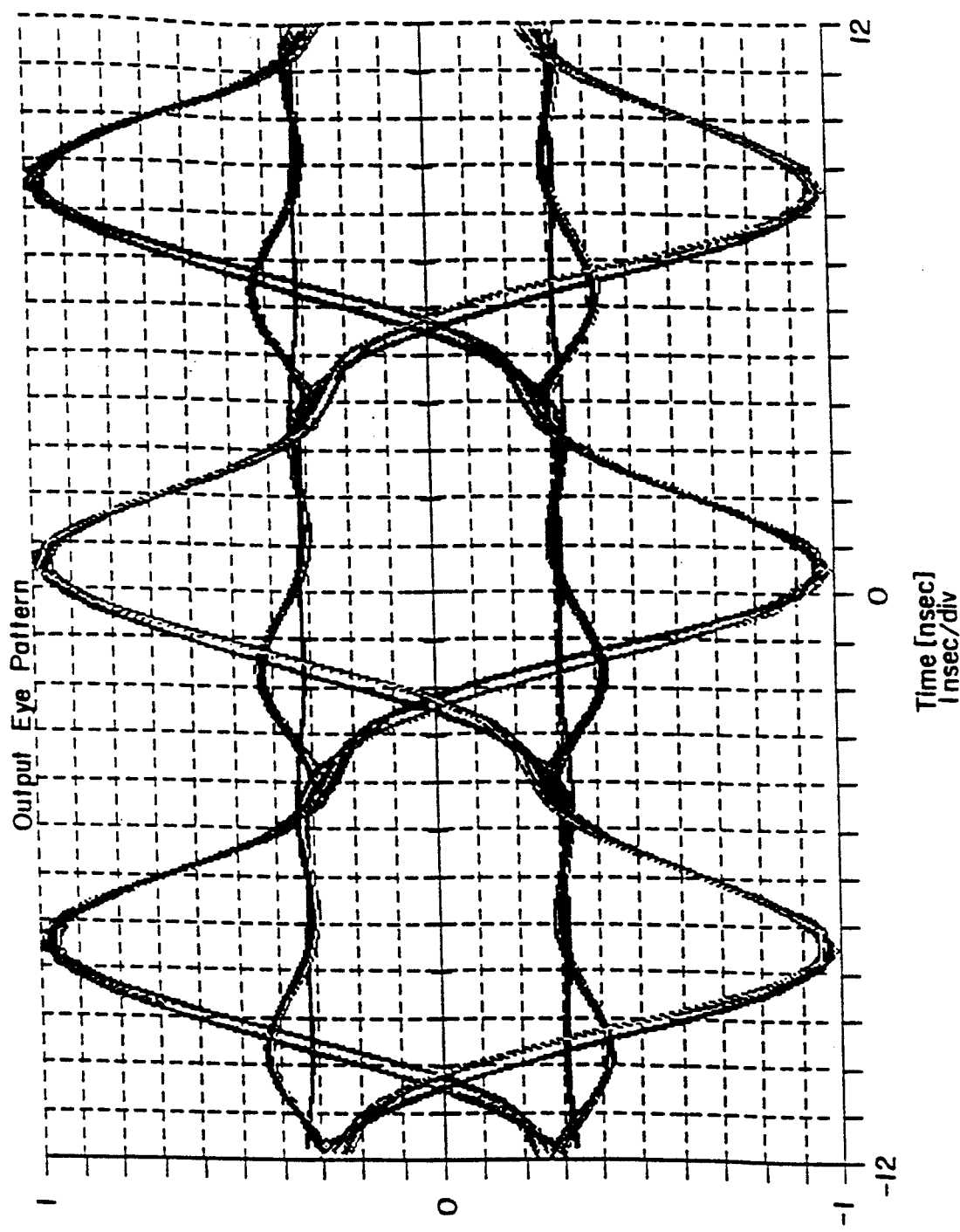
FIG. 8c is a diagram illustrating the transmitter "eye pattern" (illustrating all possible combinations of transmit data patterns superimposed on one another)

FIG. 8a shows a logic "one" pulse as an input waveform to the transmitter 40. This logic "one" pulse is an electrical data signal in the form intended to drive a fiber optic data interface. This input waveform is conditioned by the buffer 50, the equalizer 52 and the filter 54 to provide a logic "one" pulse output waveform as shown in FIG. 8b. FIG. 8c shows the transmitter "eye pattern". The transmitter "eye pattern" shown in 8c illustrates all possible combinations of transmit data patterns superimposed on one another.

As seen in FIG. 5, the receiver includes a filter 66, a buffer 68, a low frequency restoration circuit 69 and a signal detect circuit 70.

The filter 66 again serves mainly to reject signals outside the band of data signaling. The implementation may again be by using discreet passive components.

The buffer 68 receives the signal from the filter and serves to regenerate the signal received from the shielded twisted pair medium back to adequate signal levels. According to the preferred embodiment, the buffer is implemented with cascaded line receivers designed in emitter-coupled logic technology. The low frequency restoration circuit 69 senses the data at the receiver output. This acts to high-pass filter the data signal in order to prevent a linear gain in the loop, then re-buffers the data, in order to get rid of the high-pass filter effect at the signal presence, and filters the data using a low-pass filter with a complementary response to that of the two transformers in the media interface. The filter output, equal to the lost low-frequency signal content, is fed to the receiver buffer 68 through a resistive attenuator which matches the media low frequency attenuation.

The signal detect circuitry 70 is coupled to the output of the buffer 68 and distinguishes between the presence and absence of an input signal. The output of the signal detect circuit is a logical indication of signal presence. The implementation of the function in the preferred embodiment employs a peak detector circuit using the emitter-coupled logic technology, followed by a buffering gate.

FIGS. 7A-7D show in further detail a preferred layout of the high speed transmission link receiver according to the invention. The individual components have values which will necessarily vary according to the impedance and medium type selected for the transmission link.

For the example using the 150 ohm twisted pair medium, the balancing circuit 60 of the receiver receives data from lines RX+ and RX— and employs a transformer 120 connected at one side to the terminals RX+ and RX— and at another side to the filter 66. A central terminal of the transformer 120 is connected to VBB2 and to ground over capacitor C48 of 0.1 µF. VBB2 is connected to ground over capacitor C35 of 0.01 µF.

For the 150 ohm twisted pair medium, filter 66 includes capacitor C39 of 4 picofarad and capacitor C40 of 4 picofarads and capacitor C38 of 5 picofarads, capacitor C41 of 5 picofarads, inductor L7 and L8 of 68 nanohenries and resistors R21 of 150 ohms, resistor R36 of 160 ohms and R35 of 160 ohms. Each of the output terminals 122 and 124 of filter 66 are connected to the feedback terminals of the low frequency restoration circuit 69 (see FIG. 7B).

The terminals 122 and 124 are connected to gate 130 (MC10E11603-XX). The outputs of this gate are connected to an arrangement including resistor R22 of 330 ohms connecting the output to ground, resistor R23 of 330 ohms connecting the other output to ground, resistor R24 of 16K ohms connected to VBB2, capacitor C42 of 0.1 µF, capacitor C43 of 0.1 µF, resistor R48 of 100 ohms, resistor R25 of 16K ohms connected to the VBB2 and connected to ground via capacitor C37 of 0.1 μF. The signal is then passed through gate 140 to DATAOUT+ pin P11 and DATAOUT− pin P10. The signals from the DATAOUT+ line and the DATAOUT− lines are fed back through low frequency restoration circuit 69. The DATOUT+ and the DATAOUT− lines are also connected to a signal detect circuit 70.

According to the implementation using 150 ohm twisted pair medium, the signal detect circuit for the 150 ohm medium implementation in connected to the DATAOUT+ terminal through capacitor C44 of 0.1 μF and resistor R26 of 180, ohms. The DATAOUT− terminal is connected through capacitor C45 of 0.1 μF and over resister R27 of 180 ohms. These resistors R26 and R27 are connected to input terminals 142 and 144 of gate 150. The terminals 142 and 144 are bridged by resistor R28 of 33 ohms. The terminal point 142 is connected to VCC2 across resistor R30 of 1.8K ohms which is connected to ground by capacitor C28 of 10 μF, capacitor C29 of 0.1 μF, capacitor C33 of 1,000 picofarads, capacitor C32 of 0.01 μF, capacitor 630 of 0.1 μF and capacitor C32 of 1,000 picofarads and across inductor L6 (F-BEADS) to VCCINRX by positive pins P3, P4, P9 and negative pins P1, P5 and P6 connected to ground. Terminal 144 is connected to ground over resistor R29 of 7.5K ohms. The output terminals of gate 150 are connected to the input terminals of gate 160 by an arrangement including a resistor R32 of 2K ohms connecting an output terminal of gate 150 to ground, a resistor R31 of 2K ohms connecting the other output terminal of gate 150 to ground which is also connected to ground through capacitor C46 of 4,700 picofarads and including resistor R33 of 2K ohms, resistor R34 of 2K ohms and capacitor C47 of 4,700 picofarads. The output of gate 160 is the signal detect positive and negative terminals—SD+ and SD−. (Explain capacitor C36, C51 and C53 and terminals J12 and J17).

The low frequency restoration circuit 69 is connected to the DATAOUT+ and the DATAOUT− terminals. The connection of the DATAOUT+ terminal to an input terminal of gate 170 is made over resistor 47 of 180 ohms and through capacitor 48 of 1 μF and the other terminal of gate 170 is connected to the DATAOUT− terminal over resistor R46 of 180 ohms and through capacitor C49 of 1 μF. The plus input 172 of gate 170 is connected to VBB2 through inducted L10 of 5.6 microhenries whereas the minus terminal 174 of gate 170 is connected to VBB2 through the inductor L9 of 5.6 microhenries with the plus and minus terminals 172, 174 being bridged by a resistor R45 of 100 ohms. The output of gate 170 is connected to the input terminals 122 and 124 of gate 130 by an arrangement including resistor R37 of 1K ohm, resistor R38 of 100 ohms, resistor R40 of 1K ohm, resistor R39 of 100 ohms (please confirm this value), resistor R40 of 1K ohm, resistor R41 of 22 ohms, resistor R42 of 330 ohms, connected to ground, resistor R43 of 22 ohms, resistor R44 of 330 ohms, connected to ground, and capacitor C50 of 0.1 μF and capacitor C51 of 2.2 μF.

Figure 9A:
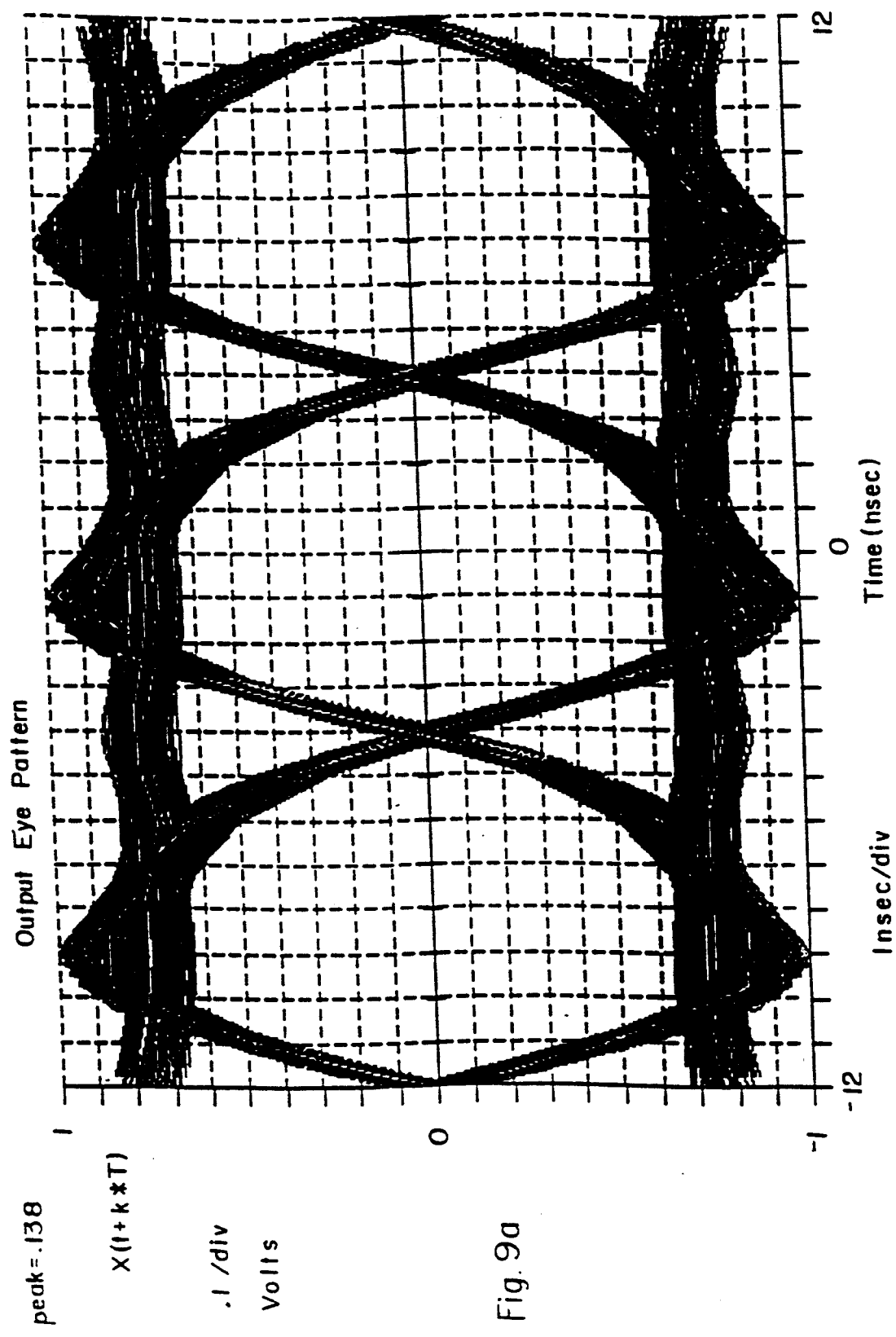
FIG. 9a is a diagram illustrating the eye pattern input to the receiver after transfer through 100 m of a typical twisted pair cable.

The input to the receiver after transfer through 100 m of a typical twisted pair cable is shown in FIG. 9a. This is a representation of all possible combination of receive data pattern superimposed on one another. The degree of opening of the "eye" is an indication of the ability of the receiver to accurately recover the data. FIG. 9b shows the eye pattern output of the receiver based on the input as shown in FIG. 9a.

While a specific embodiment of the invention has been shown and described in detail to illustrate the application of the principles of the invention, it will be understood that the invention may be embodied otherwise without departing from such principles.

What is claimed is:

1. An extremely high speed transmission link system, comprising:
 a transmission cable formed from one of twisted pair, shielded twisted pair, coaxial cable media or the like, said cable having frequency domain characteristics which distort high speed data transmission;
 a transmitter connected to said cable, said transmitter including conversion means for receiving high speed data transmission signals and for converting said high speed data transmission signals into high speed transmission link signals operating at a rate above 32 megabauds and up to 125 megabauds, said high speed transmission link signals being composed to overcome said frequency domain characteristics which distort said high speed data transmission signals;
 a receiver connected to said transmitter via said transmission cable, said receiver including reconversion means for regenerating a signal received from said transmission cable to an adequate signal level; and
 a concentrator platform connected to either one of said transmitter or said receiver, said concentrator platform including signal channel means for transferring said high speed data transmission signals, said concentrator platform including another transmitter and another receiver, said channel means transferring said high speed data transmission signals between said one of said transmitter or said receiver, and said another transmitter or receiver connected to said concentrator platform.

2. A system according to claim 1, wherein said concentrator platform includes control means for establishing said high speed data transmission signal for an FDDI local area network defined by ANSI X3T9.5 standard between a transmitter and a receiver connected to said concentrator platform.

3. An extremely high speed transmission link system according to claim 1, wherein said conversion means includes a buffer cooperating with an equalizer and a filter for receiving said high speed data signals and forming said high speed transmission link signal, said equalizer providing frequency domain compensation to said high speed transmission link signal for compensating distortion caused by said cable, said filter rejecting signals outside a band of data signaling of said high speed transmission link signal.

4. An extremely high speed transmission link system according to claim 3, wherein said transmitter further includes a balancing circuit for coupling a signal from said filter onto said cable, said balancing circuit insuring signaling balance on two wire portions of said cable selected, promoting good signal quality and reducing radiated emissions.

5. An extremely high speed transmission link system according to claim 1, wherein said receiver reconversion means includes a filter connected to said cable to reject signals outside a band of data signalling and to limit radiated emissions and a buffer for regenerating said signal received from said cable back to an adequate signal level.

6. An extremely high speed transmission link system according to claim 1, wherein said receiver includes signal detect circuit means for distinguishing between a presence and an absence of an input signal.

7. An extremely high speed transmission link system according to claim 1, wherein said concentrator platform includes at least one physical channel and slots connected to said at least one physical channel for receiving media dependent modules.

* * * * *